United States Patent [19]

Dupont et al.

[11] Patent Number: 5,877,103

[45] Date of Patent: *Mar. 2, 1999

[54] DARK GREY SODA-LIME GLASS

[75] Inventors: Camille Dupont, Heppignies; Daniel D'Hont, Maffle, both of Belgium

[73] Assignee: Glaverbel, Brussels, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 707,255

[22] Filed: Sep. 3, 1996

[30] Foreign Application Priority Data

Sep. 6, 1995 [LU] Luxembourg .............................. 88 653

[51] Int. Cl.$^6$ .................................................. C03C 3/087
[52] U.S. Cl. ................................ 501/71; 501/905; 501/64
[58] Field of Search .................................. 501/71, 905, 64

[56] References Cited

U.S. PATENT DOCUMENTS

| | | | |
|---|---|---|---|
| 4,104,076 | 8/1978 | Pons | 501/41 |
| 5,023,210 | 6/1991 | Krumwiede et al. | 501/71 |
| 5,352,640 | 10/1994 | Combes et al. | 501/71 |
| 5,545,596 | 8/1996 | Alvarez-Casariego et al. | 501/71 |
| 5,582,455 | 12/1996 | Casariego et al. | 501/71 |
| 5,656,560 | 8/1997 | Stotzel et al. | 501/72 |
| 5,726,109 | 3/1998 | Ito et al. | 501/71 |
| 5,728,471 | 3/1998 | Dupont et al. | 501/69 |
| 5,776,846 | 7/1998 | Sakaguchi et al. | 501/70 |

FOREIGN PATENT DOCUMENTS

| | | |
|---|---|---|
| 0452207 | 10/1991 | European Pat. Off. . |
| 0536049 | 4/1993 | European Pat. Off. . |
| 2690437 | 10/1993 | France . |
| 1352189 | 5/1974 | United Kingdom . |

*Primary Examiner*—Karl Group
*Attorney, Agent, or Firm*—Venable; George H. Spencer; Ashley J. Wells

[57] ABSTRACT

Soda lime glass includes glass forming constituents for soda lime glass; and coloring agents including iron, cobalt, selenium and chromium express in the form indicated and in an amount as percent by weight of the soda lime glass as follows:

from 1.05 to 1.80% of $Fe_2O_3$, from 0.0040 to 0.0180% of Co, from 0.0003 to 0.0040% of Se, and from 0.0010 to 0.0100% of $Cr_2O_3$.

The soda lime glass has a dark grey color, a total energy transmission measured for a glass thickness of 4mm (TE4) mm (TE4) ranging between 15 to 40%, a selectivity (SE4) which is high and is at least 1.2, and an excitation purity which does not exceed 10%. This glass is particularly suitable for automobile rear windows or rear side windows.

15 Claims, No Drawings

DARK GREY SODA-LIME GLASS

CROSS-REFERENCE TO RELATED APPLICATION

This application claims the priority of Grand Duchy of Luxemburg Patent Application n° 88 653 dated 6 Sep., 1995 and titled "Dark grey soda-lime glass", the subject matter of which is incorporated herein by reference.

BACKGROUND OF THE INVENTION

1. Field of the Invention

The present invention relates to a dark grey coloured soda-lime glass composed of glass-forming constituents and colouring agents.

The expression "soda-lime glass" is used here in a wide sense and concerns any glass composed of the following constituents (percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

This type of glass is used very widely in the field of glazing for buildings or motor vehicles. It is generally manufactured in the form of a ribbon by a drawing or float process. A ribbon of this type may be cut up in the form of sheets which may then be made curved or subjected to a treatment, for example heat treatment, to reinforce the mechanical properties.

2. Description of the Related Art

When speaking of the optical properties of a sheet of glass, it is generally necessary to relate these properties to a standard illuminant. In the present description, two standard illuminants are used; Illuminant C and Illuminant A as defined by the International Commission on Illumination (C.I.E.). Illuminant C represents average daylight having a colour temperature of 6700K. This illuminant is especially useful for evaluating the optical properties of glasses intended for buildings. Illuminant A represents the radiation of a Planck radiator at a temperature of about 2856K. This illuminant represents the light emitted by car headlamps and is essentially intended to evaluate the optical properties of glass intended for motor vehicles. The International Commission on Illumination has also published a document entitled "Colorimetry, Official Recommendations of the C.I.E." (May 1970) which describes a theory according to which the calorimetric coordinates for the light of each wavelength of the visible spectrum are defined in such a way as to be represented on a diagram (known as the C.I.E. trichromatic diagram) having orthogonal axes x and y. This trichromatic diagram shows the location representing the light for each wavelength (expressed in nanometers) of the visible spectrum. This location is called the "spectrum locus" and the light whose coordinates are situated on this spectrum locus is said to possess a 100% excitation purity for the appropriate wavelength. The spectrum locus is closed off by a line called the purple boundary which joins the points of the spectrum locus, the coordinates of which correspond to wavelengths of 380 nm (violet) and 780 nm (red). The area included within the spectrum locus and the purple boundary is that available for the trichromatic coordinates of any visible light. The coordinates of the light emitted by Illuminant C, for example, correspond to x=0.3101 and y=0.3163. This point C is considered as representing white light and on account of this has an excitation purity equal to zero for any wavelength. Lines may be drawn from the point C to the spectrum locus at any desired wavelength and any point situated on these lines may be defined not only by its coordinates x and y, but also as a function of the wavelength corresponding to the line on which it is situated and its distance from the point C with respect to the total length of the wavelength line. From this, light transmitted by a coloured sheet of glass may be described by its dominant wavelength and its excitation purity expressed in percent.

In fact the C.I.E. coordinates of light transmitted by a coloured glass sheet will depend not only on the composition of the glass but also on its thickness. In the present description and claims all the values of the trichromatic coordinates (x,y), of the excitation purity (P), of the dominant wavelength $\lambda_D$ of the transmitted light, and of the light transmittance of the glass (TL) are calculated from the specific internal transmission ($SIT_\lambda$) of a 5 mm thick glass sheet. The specific internal transmission of a glass sheet is governed solely by the absorption of the glass and may be expressed by the Beer-Lambert law; $SIT_\lambda = e^{-E \cdot A\lambda}$ where $A\lambda$ is the absorption coefficient of the glass (in $cm^{-1}$ at the wavelength in question and E is the thickness of the glass (in cm). As a first approximation, $SIT_\lambda$ may also be represented by the formula $$(I_{3\lambda} + R_{2\lambda})/(I_{1\lambda} - R_{1\lambda})$$

where $I_{1\lambda}$ is the intensity of the visible light on the first face of the glass sheet, $R_{1\lambda}$ is the intensity of the visible light reflected by this face, $I_{3\lambda}$ is the intensity of the visible light transmitted from the second face of the glass sheet and $R_{2\lambda}$ is the intensity of the visible light reflected to the interior of the sheet by this second face.

In the present description and claims, the following are used.

The total luminous transmission for illuminant A, measured for a thickness of 4 mm (TLA4). This total transmission is the result of integrating the expression:

$$\Sigma T_\lambda \cdot E_\lambda \cdot S_\lambda / \Sigma E_\lambda \cdot S_\lambda$$

between the wavelengths 380 and 780 nm, in which $T_\lambda$ is the transmission at wavelength $\lambda$, $E_\lambda$ is the spectral distribution of illuminant A and $S_\lambda$ is the sensitivity of the normal human eye as a function of the wavelength $\lambda$.

The total energy transmission, measured for a thickness of 4 mm (TE4). This total transmission is the result of integrating the expression:

$$\Sigma T_\lambda \cdot E_\lambda / \Sigma E_\lambda$$

between the wavelengths 300 and 2150 nm, in which $E_\lambda$ is the spectral energy distribution of the sun at 30° above the horizon (Moon's distribution).

The selectivity, measured for a thickness of 4 mm (SE4), is defined by the ratio (TLA4/TE4).

The total transmission in the ultra-violet, measured for a thickness of 4 mm (TUVT4). This total transmission is the result of integrating the expression:

$$\Sigma T_\lambda \cdot U_\lambda / \Sigma U_\lambda$$

between the wavelengths 280 and 380 nm, in which $U_\lambda$ is the spectral distribution of ultra-violet radiation having passed through the atmosphere, as determined as in DIN standard 67507.

The present invention concerns in particular grey glasses with a greenish shade. When the transmission curve of a transparent substance does not vary as a function of the visible wavelength, this substance is described as "neutral grey". In the C.I.E. system, it does not possess a dominant wavelength and its excitation purity is zero. By extension, a body may be considered as grey for which the spectral curve is relatively flat in the visible region but nevertheless exhibits weak absorption bands, enabling a dominant wavelength to be defined and a purity that is low but not zero. Grey glass according to the present invention has an excitation purity not exceeding 10%, preferably not exceeding 6% and a dominant wavelength between 480 and 560 nm, corresponding to a greenish shade.

Grey glasses are generally selected for their protecting properties against the rays of the sun and their use in buildings is known, especially in very sunny countries. Grey glasses are also used in balcony balustrades or staircases as well as for partial glazing in certain motor vehicles or railway compartments. To shield their contents from view, very dark grey glass is mainly employed.

The present invention relates to a selective dark grey glass especially appropriate for use as automobile windows, in particular as rear windows or rear side windows.

SUMMARY OF THE INVENTION

The present invention provides a dark grey coloured soda-lime glass composed of glass-forming constituents and colouring agents, characterised in that the elements iron, cobalt, selenium and chromium are present as colouring agents in the following proportions (expressed in the form indicated as percentages by weight of the glass):

| | |
|---|---|
| $Fe_2O_3$ | 0.75 to 1.80% |
| Co | 0.0040 to 0.0180% |
| Se | 0.0003 to 0.0040% |
| $Cr_2O_3$ | 0.0010 to 0.0100% | the proportions of colouring agents being such that the glass has a total energy transmission, measured for a glass thickness of 4 mm (TE4), of between 15 and 40%, and a high selectivity (SE4) of at least 1.2 with an excitation purity not exceeding 10%.

The present invention further provides a dark grey coloured soda-lime glass of the above composition with a selectivity reaching at least 1.4.

In one embodiment the invention provides a dark grey coloured alkali-lime glass composed of glass-forming constituents and colouring agents, characterised in that the elements iron, cobalt, selenium and chromium are present as colouring agents in the following proportions (expressed in the form indicated as percentages by weight of the glass):

| | |
|---|---|
| $Fe_2O_3$ | 0.75 to 1.50% |
| Co | 0.0060 to 0.0180% |
| Se | 0.0005 to 0.0040% |
| $Cr_2O_3$ | 0.0010 to 0.0100% | the proportions of colouring agents being such that the glass has a total energy transmission, measured for a glass thickness of 4 mm (TE4), of between 15 and 40%, and a high selectivity (SE4) of at least 1.2 with an excitation purity not exceeding 6%.

A coloured glass as defined in the above statements of invention is particularly advantageous since a high selectivity of at least 1.2 associated with a low energy transmission nevertheless permits the achievement of luminous transmission values corresponding to the minimum values recommended for vehicle windows for safety reasons.

In fact, a glass having an almost similar coloration can be produced by using nickel as the main colouring agent. The presence of nickel however presents certain disadvantages, especially when the glass has to be produced by the float process. In the float process, a ribbon of hot glass is led along the surface of a bath of molten tin so that its faces are plane and parallel. In order to avoid oxidation of the tin at the surface of the bath, which would lead to entrainment of tin oxide by this ribbon, a reducing atmosphere is maintained above the bath. When the glass contains nickel, this is partially reduced by the atmosphere above the tin bath giving rise to a haze in the glass produced. In addition, nickel present in the glass may form nickel sulphide NiS. This sulphide exists in various crystalline forms, which are stable within different temperature ranges, transformation from one to the other creating problems when the glass has to be reinforced by a heat tempering treatment, as is the case in the automotive field and also for certain glazing used in buildings (balconies, spandrels, etc.). Glass according to the invention, which does not contain nickel, is thus particularly well suited to manufacture by the float process as well as to architectural use or in the field of motor or other vehicles.

The combined presence of iron, cobalt, selenium and chromium as colouring agents enables the optical and energy properties of grey glass according to the invention to be controlled. The effects of different colouring agents considered individually for the preparation of a glass are as follows (as described in the German handbook "Glas" by H. Scholtze,—translated by J. Le Dû—Glass Institute—Paris):

Iron: Iron is in fact present in most glasses existing on the market, either as an impurity or introduced deliberately as a colouring agent. The presence of ferric ions ($Fe^{3+}$), gives glass a slight absorption of visible light having a short wavelength (410 and 440 nm) and a very strong absorption band in the ultra-violet (absorption band centred on 380 nm), whereas the presence of ferrous ($Fe^{2+}$) ions causes a strong absorption in the infra-red (absorption band centred on 1050 nm). Ferric ions give glass a slight yellow colour whereas ferrous ions give a more pronounced blue-green coloration. Other things being equal, it is the ferrous ions which are responsible for the absorption in the infra-red range and which establish the energy transmission (TE). The TE value falls, which raises the selectivity, as the concentration of ferrous ions increases. A high selectivity is obtained by favouring the presence of ferrous ions relative to ferric ions.

Selenium: The $Se^{4+}$ cation has practically no colouring effect, whereas the uncharged element $Se^0$ gives a pink coloration. The $Se^{2-}$ anion forms a chromophore with ferric ions present and on account of this gives a brownish red colour to the glass.

Cobalt: The $Co^{II}O_4$ group produces an intense blue coloration with a dominant wavelength virtually opposite to that given by the iron-selenium chromophore.

Chromium: The presence of the $Cr^{III}O_6$ group gives rise to absorption bands at 650 nm and gives a light green colour. More stringent oxidation gives rise to the $Cr^{VI}O_4$ group which causes a very intense absorption band at 365 nm and gives a yellow coloration.

Cerium: The presence of cerium ions in the composition enables a strong absorption to be obtained in the ultra-violet. Cerium oxide exists in two forms; $Ce^{IV}$ absorbs in the ultra-violet at around 240 nm and $Ce^{III}$ absorbs in the ultra-violet at around 314 nm.

The energy and optical properties of glass containing several colouring agents thus results from a complex interaction between them, each of these colouring agents having a behaviour which depends strongly on the redox state and thus on the presence of other elements likely to influence this state.

We have observed that the proportions of the colouring agents iron, cobalt, selenium and chromium within the above-defined limits enable the achievement of a high selectivity with the lowest possible energy transmission (TE4) so as to avoid excessive heating in a vehicle interior.

DESCRIPTION OF THE PREFERRED EMBODIMENTS

Glass according to the invention preferably has a total luminous transmission (TLA4) of between 20 and 50%, which make it particularly useful in avoiding dazzle from automobile headlights when it is used as vehicle rear windows or rear side windows.

Glass according to the invention also preferably has a total luminous transmission, measured for Illuminant C for a glass thickness of 5 mm (TLC5), of between 20 and 40%, which make it useful in eliminating glare from sunlight when it is used in buildings.

In one preferred embodiment of the invention, the grey-coloured glass is characterised by the presence of the element cerium in a quantity corresponding to the following proportions (expressed in the form indicated as a percentage by weight of the glass):

| | |
|---|---|
| $CeO_2$ | 0 to 1.0%. |

Combined with the colouring agents within the above-defined limits the presence of cerium in such quantities enables a strong absorption to be achieved in the ultra-violet range, corresponding to total transmission in the ultra-violet range (TUV4) of less than 15%. This property is particularly advantageous in the automotive field. The low transmission of ultra-violet radiation enables the ageing and discolouration of interior trim in motor vehicles to be avoided.

In a particularly preferred embodiment of the invention, the grey-coloured glass is characterised by the presence of colouring agents in a quantity corresponding to the following proportions (expressed in the form indicated as percentages by weight of the glass):

| | |
|---|---|
| $Fe_2O_3$ | 0.90 to 1.40% |
| Co | 0.0080 to 0.0130% |
| Se | 0.0005 to 0.0030% |
| $Cr_2O_3$ | 0.0010 to 0.0080%. |

Within the above-defined preferred limits, it is possible to form glass with a total luminous transmission of Illuminant A, measured for a glass thickness of 4 mm, (TLA4) of between 25 and 45% and a total energy transmission (TE4) of between 25 and 35%.

If the element cerium is present in such glass, it should preferably be in a quantity corresponding to the following proportions (expressed in the form indicated as a percentage by weight of the glass):

| | |
|---|---|
| $CeO_2$ | 0 to 0.50%. |

Combined with the colouring agents within the above-defined limits the presence of cerium in such quantities enables a strong absorption to be achieved in the ultra-violet range, corresponding to TUV4 values of less than 10%.

The glass according to the invention can carry a metal oxide coating to reduce its heating by solar radiation and in consequence the heating of the interior of a vehicle equipped with such glazing.

Glass corresponding to the more limited concentration range defined above for the colouring agents is particularly useful since it has optimal properties of light transmission and energy transmission for use as vehicle rear windows and rear side windows. In its architectural use, its aesthetic qualities are combined with a significant energy saving associated with lower loads for air conditioning systems.

Glass according to the invention is preferably used in the form of sheets having a thickness of 3 or 4 mm for vehicle rear windows or rear side windows and more than 4 mm in buildings.

Glass according to the present invention can be manufactured by traditional methods. As raw materials there can be used natural materials, recycled glass, slag or a combination thereof. The colouring agents are not necessarily added in the form indicated, but this way of giving the quantities of added colouring agents, in equivalents in the forms indicated, corresponds to current practice. In practice, iron is added in the form of rouge, cobalt is added in the form of a hydrated sulphate, such as $CoSO_4.7H_2O$ or $CoSO_4.6H_2O$, selenium is added in the elementary form or in the form of a selenite such as $Na_2SeO_3$ or $ZnSeO_3$ and chromium is added in the form of a bichromate such as $K_2Cr_2O_7$. Cerium is added in the form of an oxide or carbonate.

Other elements may be present as impurities in the raw materials used in the manufacture of glass according to the invention (for example manganese oxide in proportions of the order of 50 ppm), which may be from the natural materials, the recycled glass or the slag, but when the presence of these impurities does not impart to the glass any properties beyond the above-defined limits the glass is taken as conforming to the present invention.

The present invention is illustrated by the following specific examples of compositions.

EXAMPLES 1 TO 17

Table I gives the base composition of glass as well as the constituents of the vitrifiable batch to be melted in order to produce glasses according to the invention (the quantities being expressed in kilogrammes per tonne of the vitrifiable batch). Table IIa gives the weights of the components providing the colouring agents in the vitrifiable batch. Table IIb gives the proportions by weight of the colouring agents in the glass produced. These proportions are determined by X-ray fluorescence of the glass and converted into the molecular species indicated. Table III gives the optical and energy properties corresponding to the definitions given in the present description.

TABLE I

BASE GLASS

Analysis of the base glass

| | |
|---|---|
| $SiO_2$ | 71.5 to 71.9% |
| $Al_2O_3$ | 0.8% |
| CaO | 8.8% |
| MgO | 4.2% |
| $Na_2O$ | 14.1% |

TABLE I-continued

| BASE GLASS | |
|---|---|
| $K_2O$ | 0.1% |
| $SO_3$ | 0.1 to 0.5% |
| Constituents of the base glass | |
| Sand | 572.6 |
| Feldspar | 29.6 |
| Limestone | 35.7 |
| Dolomite | 167.7 |
| $Na_2CO_3$ | 176.7 |
| Sulphate | 8.1 |
| Nitrate | 10.1 |

This mixture can if required contain a reducing agent such as coke, graphite or slag.

TABLE IIa

| Example No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $Fe_2O_3$ (kg) | 7.43 | 8.31 | 8.72 | 9.98 | 8.97 | 9.06 | 10.3 | 7.1 | 8.23 | 9.06 | 9.14 | 9.56 | 8.64 | 8.47 | 8.39 | 11.6 | 13.3 |
| CoO (kg) | 0.115 | 0.121 | 0.125 | 0.115 | 0.105 | 0.104 | 0.045 | 0.054 | 0.121 | 0.117 | 0.118 | 0.112 | 0.132 | 0.097 | 0.100 | 0.098 | 0.106 |
| Se (kg) | 0.037 | 0.037 | 0.053 | 0.027 | 0.035 | 0.043 | 0.006 | 0.023 | 0.023 | 0.045 | 0.045 | 0.055 | 0.047 | 0.023 | 0.006 | 0.010 | 0.017 |
| $K_2Cr_2O_7$ (kg) | 0.118 | 0.121 | 0.071 | 0.106 | 0.040 | 0.040 | 0.034 | 0.045 | 0.111 | 0.025 | 0.030 | 0.020 | 0.057 | 0.078 | 0.071 | 0.044 | 0.055 |

TABLE IIb

| Example No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $Fe_2O_3$ (%) | 0.956 | 1.061 | 1.110 | 1.260 | 1.140 | 1.150 | 1.3 | 0.917 | 1.051 | 1.150 | 1.160 | 1.210 | 1.100 | 1.080 | 1.070 | 1.45 | 1.66 |
| Co (ppm) | 110 | 116 | 120 | 110 | 101 | 100 | 43 | 52 | 116 | 112 | 113 | 107 | 126 | 93 | 95 | 94 | 101 |
| Se (ppm) | 18 | 18 | 26 | 13 | 17 | 21 | 3 | 11 | 11 | 22 | 22 | 27 | 23 | 11 | 3 | 5 | 8 |
| $Cr_2O_3$ (ppm) | 74 | 76 | 45 | 67 | 25 | 25 | 21 | 28 | 70 | 16 | 19 | 13 | 36 | 49 | 45 | 27 | 34 |
| $CeO_2$ (%) | | | | | | | | | | | | | 0.17 | 0.41 | 0.46 | | |

TABLE III

| Example No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $\lambda_D$ (nm) | 502.7 | 539.7 | 566.0 | 504.1 | 495.6 | 505.6 | 509.6 | 548.3 | 490.4 | 556.7 | 568.9 | 565.6 | 516.4 | 495.4 | 489.8 | 493.5 | 539.1 |
| Purity (%) | 2.3 | 2.9 | 6.4 | 4.0 | 4.4 | 2.6 | 4.77 | 3.88 | 7.8 | 4.8 | 9.1 | 8.1 | 1.6 | 5.0 | 9.5 | 9.04 | 6.84 |
| TLA4 (%) | 33.0 | 31.0 | 27.5 | 32.2 | 36.8 | 34.6 | 48.61 | 50.74 | 35.1 | 31.1 | 28.3 | 29.4 | 31.1 | 40.7 | 43.6 | 40.02 | 30.93 |
| TE4 (%) | 27.2 | 25.0 | 23.0 | 23.1 | 28.3 | 26.5 | 30.3 | 38.5 | 27.0 | 24.8 | 23.2 | 22.6 | 25.4 | 32.6 | 33.6 | 26.5 | 20.7 |
| TUVtot4 (%) | 6.0 | 4.9 | 4.0 | 4.1 | 53 | 4.9 | 4 | 9 | 6.2 | 4.3 | 3.5 | 3.4 | 4.2 | 4.2 | 5.0 | 4.5 | 1.3 |
| SE4 | 1.21 | 1.24 | 1.20 | 1.39 | 1.30 | 1.27 | 1.60 | 1.32 | 1.30 | 1.25 | 1.22 | 1.30 | 1.23 | 1.25 | 1.30 | 1.51 | 1.49 |

What is claimed is:

1. Soda lime glass, comprising:
   glass forming constituents for soda lime glass; and
   coloring agents including iron, cobalt, selenium and chromium expressed in the form indicated in an amount as percent by weight of the soda lime glass as follows:
   from 1.05 to 1.80% of $Fe_2O_3$,
   from 0.0040 to 0.0180% of Co,
   from 0.0003 to 0.0040% of Se, and
   from 0.0010 to 0.0100% of $Cr_2O_3$,
   wherein the soda lime glass has a dark grey color, a total energy transmission measured for a glass thickness of 4 mm (TE4) ranging between 15 to 40%, a selectivity (SE4) which is at least 1.2, and an excitation purity which does not exceed 10%.

2. The soda lime glass according to claim 1, wherein the selectivity (SE4) is at least 1.4.

3. The soda lime glass according to claim 2, having a total luminous transmission measured for Illuminant A for a glass thickness of 4 mm (TLA4) ranging between 20 and 50%.

4. The soda lime glass according to claim 2, having a total luminous transmission measured for Illuminant C for a glass thickness of 5 mm (TLC5) ranging between 20 and 40%.

5. The soda lime glass according to claim 1, having a total luminous transmission measured for Illuminant A for a glass thickness of 4 mm (TLA4) ranging between 20 and 50%.

6. The soda lime glass according to claim 1, having a total luminous transmission measured for Illuminant C for a glass thickness of 5 mm (TLC5) ranging between 20 and 40%.

7. The soda lime glass according to claim 1, having a dominant wavelength ($\lambda_D$) ranging between 480 and 560 nm.

8. The soda lime glass according to claim 1, further comprising up to 1.0% of $CeO_2$.

9. The soda lime glass according to claim 8, having a total transmission in the ultra-violet region measured for a glass thickness of 4 mm (TUVT4) which is less than 15%.

10. The soda lime glass according to claim 1, wherein the coloring agents are expressed in the form indicated in an amount as percent by weight of the soda lime glass as follows:
    from 1.05 to 1.40% of $Fe_2O_3$,
    from 0.0080 to 0.0130% of Co,
    from 0.0005 to 0.0030% of Se, and
    from 0.0010 to 0.0080% of $Cr_2O_3$.

11. The soda lime glass according to claim 10, having a total luminous transmission measured for Illuminant A for a glass thickness of 4 mm (TLA4) ranging between 25 and 45%.

12. The soda lime glass according to claim 11, having a total energy transmission measured for a glass thickness of 4 mm (TE4) ranging between 20 and 35%.

13. The soda lime glass according to claim 10, having a total energy transmission measured for a glass thickness of 4 mm (TE4) ranging between 20 and 35%.

14. The soda lime glass according to claim 10, further comprising up to 0.50% of $CeO_2$.

15. The soda lime glass according to claim 14, having a total transmission in the ultra-violet region measured for a thickness of 4 mm (TUVT4) which is less than 10%.

* * * * *